(12) United States Patent
Tang et al.

(10) Patent No.: US 6,831,645 B2
(45) Date of Patent: Dec. 14, 2004

(54) SYSTEM AND METHOD FOR PERFORMING FONT OPERATIONS WHEN BACKGROUND COLOR IS TRANSPARENT

(75) Inventors: Wing-Cheong Tang, Union City, CA (US); Michael G. Lavelle, Saratoga, CA (US); Nandini Ramani, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 92 days.

(21) Appl. No.: 10/092,378

(22) Filed: Mar. 5, 2002

(65) Prior Publication Data

US 2003/0169268 A1 Sep. 11, 2003

(51) Int. Cl.[7] .............................................. G06T 11/00
(52) U.S. Cl. ...................... 345/467; 345/468; 345/469; 345/470; 345/549; 345/551; 345/581; 382/292; 358/1.11
(58) Field of Search ................................ 345/614, 642, 345/468, 469, 470, 549, 551; 382/292

(56) References Cited

U.S. PATENT DOCUMENTS

| | | | |
|---|---|---|---|
| 5,751,930 A | | 5/1998 | Katsura et al. |
| 5,870,085 A | * | 2/1999 | Laksono ...................... 345/551 |
| 6,115,498 A | * | 9/2000 | Ro et al. ...................... 382/200 |
| 6,421,059 B1 | * | 7/2002 | Priem .......................... 345/551 |
| 6,624,815 B1 | * | 9/2003 | Morrish ....................... 345/467 |

\* cited by examiner

*Primary Examiner*—Matthew C. Bella
*Assistant Examiner*—Antonio Caschera
(74) *Attorney, Agent, or Firm*—Meyertons Hood Kivlin Kowert & Goetzel, P.C.; Jeffrey C. Hood

(57) ABSTRACT

One embodiment of a method of performing a font operation involves receiving a set of font data identifying a font operation to be performed. If a first font data unit in the set indicates that a first coordinate should be a background color and transparent background is enabled, the method involves outputting an enable for a second font data unit in the set. The second font data unit indicates that a second coordinate should be a foreground color. The enable for the second coordinate is output instead of a disable for the first coordinate. If instead the first font data unit in the set indicates that the first coordinate should be a background color and transparent background is disabled, the method may involve outputting a disable for the first coordinate.

18 Claims, 12 Drawing Sheets

1000

X pointer = 1
Y pointer = 2
Increment X = 2
Increment Y = 3
Width = 6
Font Data Set 1 = 1011 0010 0000 0000 0000 0000 0000 0000
Font Data Set 2 = 1111 1010 0000 0000 0000 0000 0000 0000
Font Data Set 3 = 1100 0110 0000 0000 0000 0000 0000 0000

Opaque Background: 1102

| Font Data Set 1 | Cycle 1 | enable 1,2 | disable 2,2 |
| --- | --- | --- | --- |
| | Cycle 2 | enable 3,2 | enable 4,2 |
| | Cycle 3 | disable 5,2 | disable 6,2 |
| | Cycle 4 | enable 7,2 | |
| Font Data Set 2 | Cycle 1 | enable 3,5 | enable 4,5 |
| | Cycle 2 | enable 5,5 | enable 6,5 |
| | Cycle 3 | enable 7,5 | disable 8,5 |
| | Cycle 4 | enable 9,5 | |
| Font Data Set 3 | Cycle 1 | enable 5,8 | enable 6,8 |
| | Cycle 2 | disable 7,8 | disable 8,8 |
| | Cycle 3 | disable 9,8 | enable 10,8 |
| | Cycle 4 | enable 11,8 | |

*FIG. 11*

Transparent Background: 1104

| Font Data Set 1 | Cycle 1 | enable 1,2 | |
| --- | --- | --- | --- |
| | Cycle 2 | enable 3,2 | enable 4,2 |
| | Cycle 3 | enable 7,2 | |
| Font Data Set 2 | Cycle 1 | enable 3,5 | enable 4,5 |
| | Cycle 2 | enable 5,5 | enable 6,5 |
| | Cycle 3 | enable 7,5 | |
| | Cycle 4 | enable 9,5 | |
| Font Data Set 3 | Cycle 1 | enable 5,8 | enable 6,8 |
| | Cycle 2 | enable 10,8 | enable 11,8 |

*FIG. 12*

SYSTEM AND METHOD FOR PERFORMING FONT OPERATIONS WHEN BACKGROUND COLOR IS TRANSPARENT

BACKGROUND OF THE INVENTION

1. Field of the Invention

This invention relates generally to the field of computer graphics and, more particularly, to font operations that may be performed in a computer graphics system.

2. Description of the Related Art

A computer system typically relies upon its graphics system for producing visual output on the computer screen or display device. Early graphics systems were only responsible for taking what the processor produced as output and displaying it on the screen. In essence, they acted as simple translators or interfaces. Modern graphics systems, however, incorporate graphics processors with a great deal of processing power. They now act more like coprocessors than like simple translators. This change is due to the recent increase in both the complexity and amount of data being sent to the display device. For example, modern computer displays have many more pixels, greater color depth, and are able to display images with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating, "draw a box at these coordinates." The graphics system then draws the box, freeing the processor to perform other tasks.

Generally, a graphics system in a computer is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphics applications, and especially multimedia applications, has made high performance graphics systems a common feature in many new computer systems. Most computer manufacturers now bundle a high performance graphics system with their computing systems.

A modem graphics system may generally operate as follows. First, graphics data is initially read from a computer system's main memory into the graphics system. The graphics data may include geometric primitives such as polygons (e.g., triangles), NURBS (Non-Uniform Rational B-Splines), sub-division surfaces, voxels (volume elements) and other types of data. The various types of data are typically converted into triangles (e.g., three vertices having at least position and color information). Then, transform and lighting calculation units receive and process the triangles. Transform calculations typically include changing a triangle's coordinate axis, while lighting calculations typically determine what effect, if any, lighting has on the color of triangle's vertices. The transformed and lit triangles may then be conveyed to a clip test/back face culling unit that determines which triangles are outside the current parameters for visibility (e.g., triangles that are off screen). These triangles are typically discarded to prevent additional system resources from being spent on non-visible triangles.

Next, the triangles that pass the clip test and back-face culling may be translated into screen space. The screen space triangles may then be forwarded to the set-up and draw processor for rasterization. Rasterization typically refers to the process of generating actual pixels (or samples) by interpolation from the vertices. The rendering process may include interpolating slopes of edges of the polygon or triangle, and then calculating pixels or samples on these edges based on these interpolated slopes. Pixels or samples may also be calculated in the interior of the polygon or triangle.

As noted above, in some cases samples are generated by the rasterization process instead of pixels. A pixel typically has a one-to-one correlation with the hardware pixels present in a display device, while samples are typically more numerous than the hardware pixel elements and need not have any direct correlation to the display device. Where pixels are generated, the pixels may be stored into a frame buffer, or possibly provided directly to refresh the display. Where samples are generated, the samples may be stored into a sample buffer or frame buffer. The samples may later be accessed and filtered to generate pixels, which may then be stored into a frame buffer, or the samples may possibly be filtered to form pixels that are provided directly to refresh the display without any intervening frame buffer storage of the pixels.

A converter (e.g., a digital-to-analog converter) converts the pixels into an appropriate display signal usable by a display device. If samples are used, the samples may be read out of sample buffer or frame buffer and filtered to generate pixels, which may be stored and later conveyed to a converter. The signal from such a converter is conveyed to a display device such as a computer monitor, LCD display, or projector.

One area in which it is desirable to improve graphics systems performance is the performance of font operations such as text and fill operations. Font operations accept font information from a host and expand that information to indicate whether foreground or background color should be rendered into the frame buffer at a given location.

SUMMARY

Various embodiments of methods and systems for performing font operations are disclosed. In one embodiment, a graphics system includes a buffer (e.g., a frame buffer or a texture buffer), a font processor configured to receive a set of font data, and a fragment processor coupled to access the buffer. If the current background color is transparent and a first font data unit in the set indicates that the first coordinate should be the background color, the font processor is configured to generate an enable for a second font data unit in the set instead of generating a disable for the first coordinate. The second font data unit indicates that a second coordinate should be a foreground color. There may be several font data units in between the first and second font data units. These intervening font data units may also indicate that their associated coordinates should be the background color. When the current background color is transparent, the font processor may skip the first font data unit and the intervening font unit in order to process font data units indicating that their corresponding coordinates are the foreground color. The fragment processor is coupled to receive the enable from the font processor and to responsively write an element at the second coordinate into the frame buffer, wherein the element at the second coordinate is the foreground color.

One embodiment of a method of performing a font operation involves receiving a set of font data identifying a font operation to be performed. If a first font data unit in the set indicates that a first coordinate should be a background color and transparent background is enabled, the method involves outputting an enable for a second font data unit in the set. The second font data unit indicates that a second coordinate should be a foreground color. The enable for the second coordinate is output instead of a disable for the first coordinate. If instead the first font data unit in the set indicates that the first coordinate should be a background color and transparent background is disabled, the method may involve outputting a disable for the first coordinate.

BRIEF DESCRIPTION OF THE DRAWINGS

A better understanding of the present invention can be obtained when the following detailed description is considered in conjunction with the following drawings, in which:

FIGS. 11 and 12 are tables showing the enable and disable signals that may be generated in one embodiment for the font data sets illustrated in FIG. 10.

Figure 1:
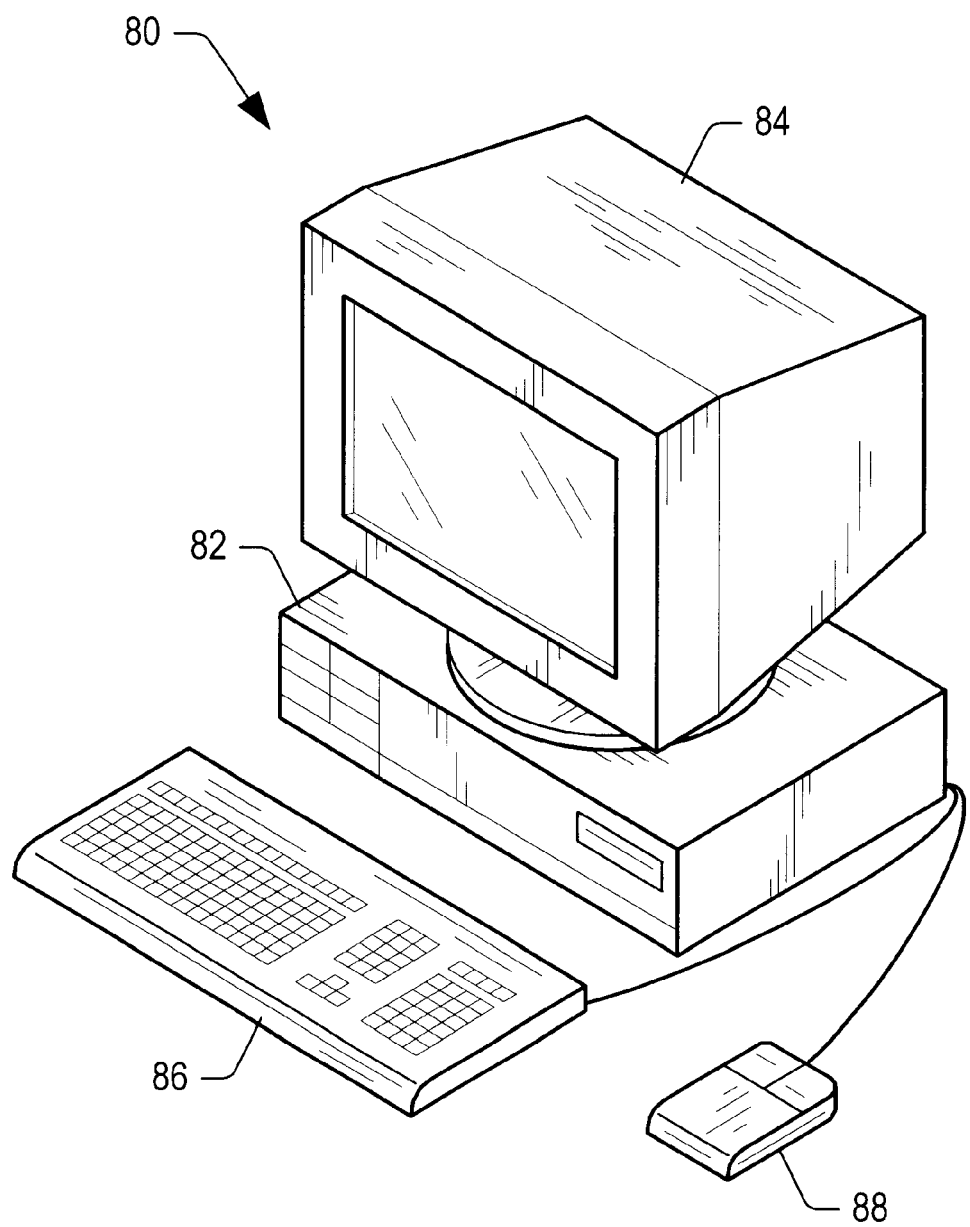
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly connected."

DETAILED DESCRIPTION OF EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices that display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
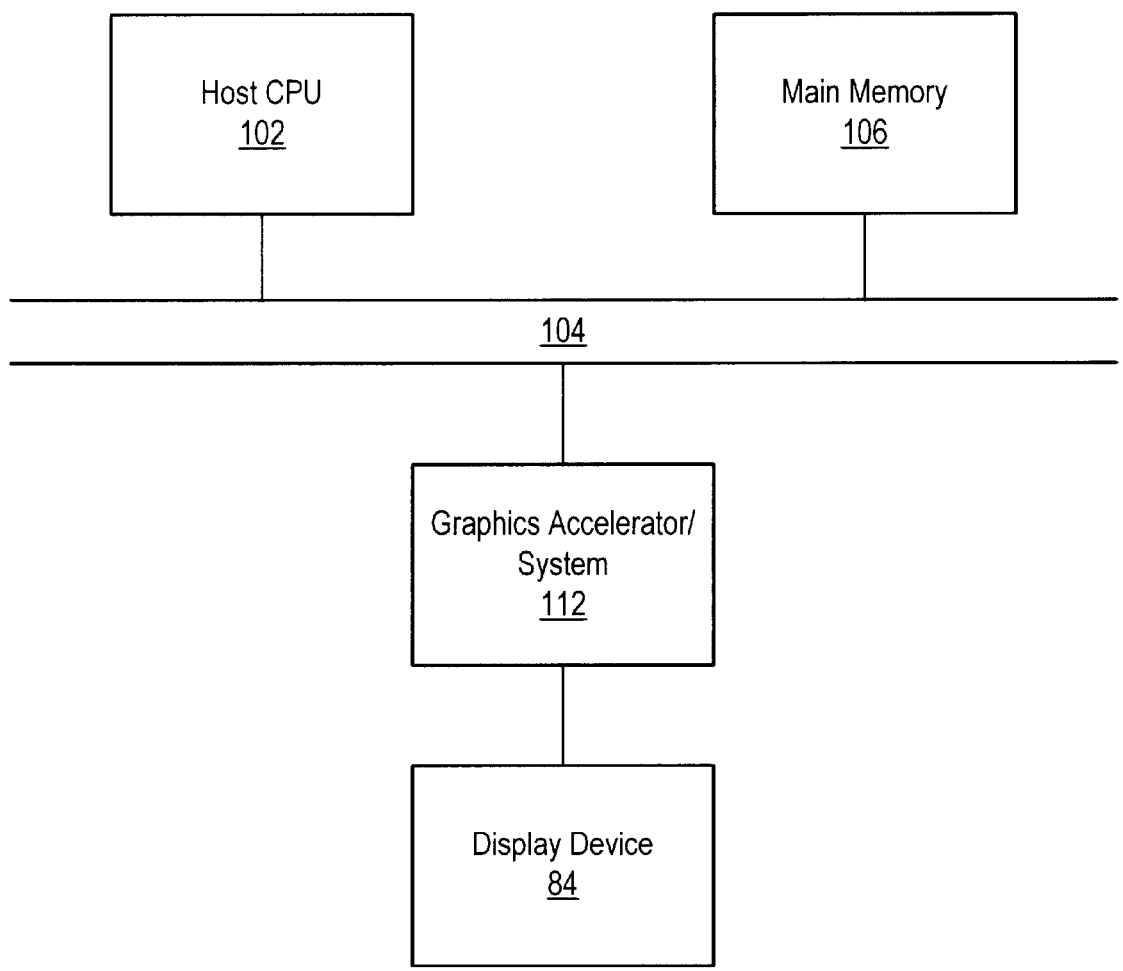
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the Figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g., the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
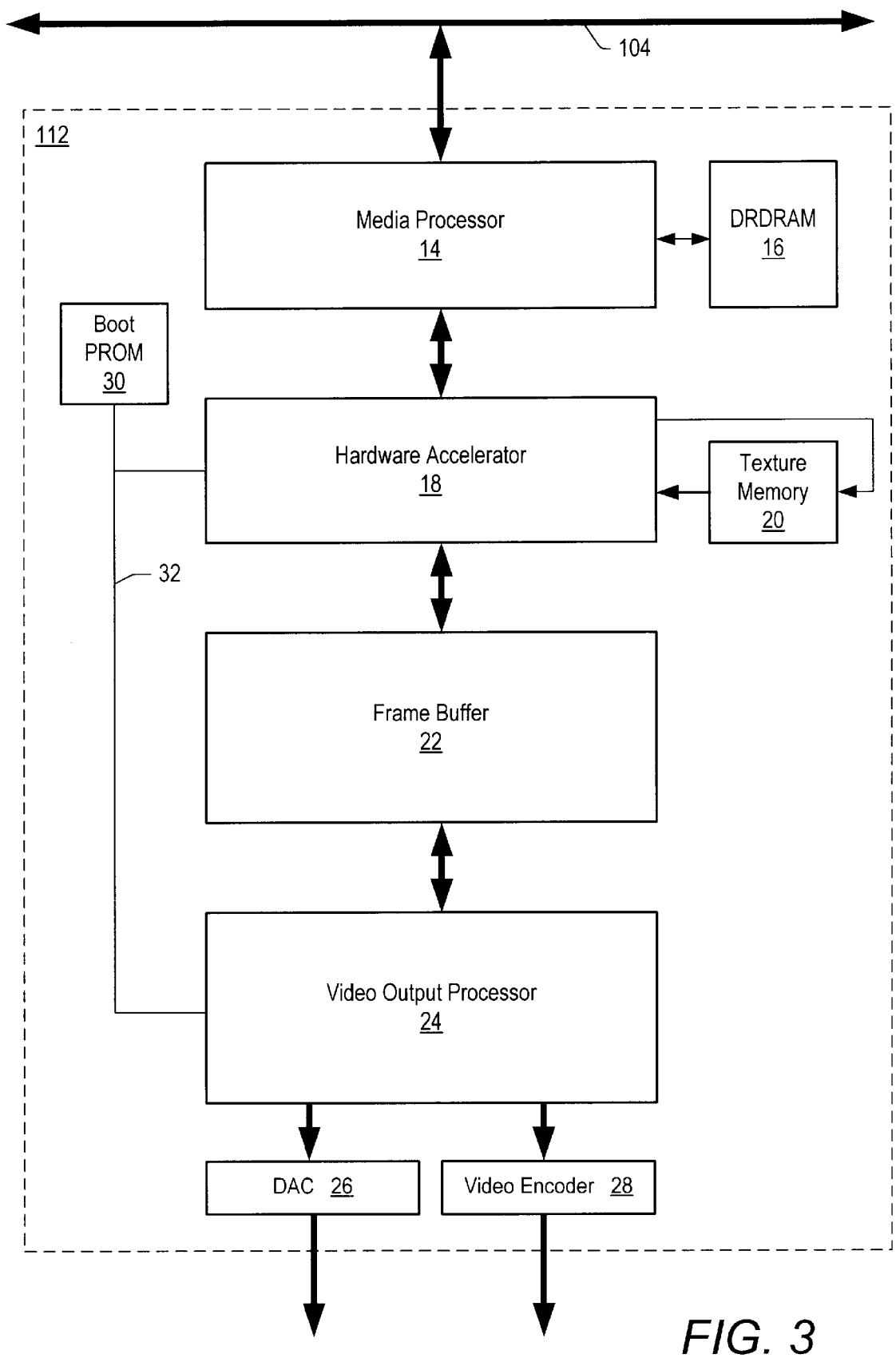
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
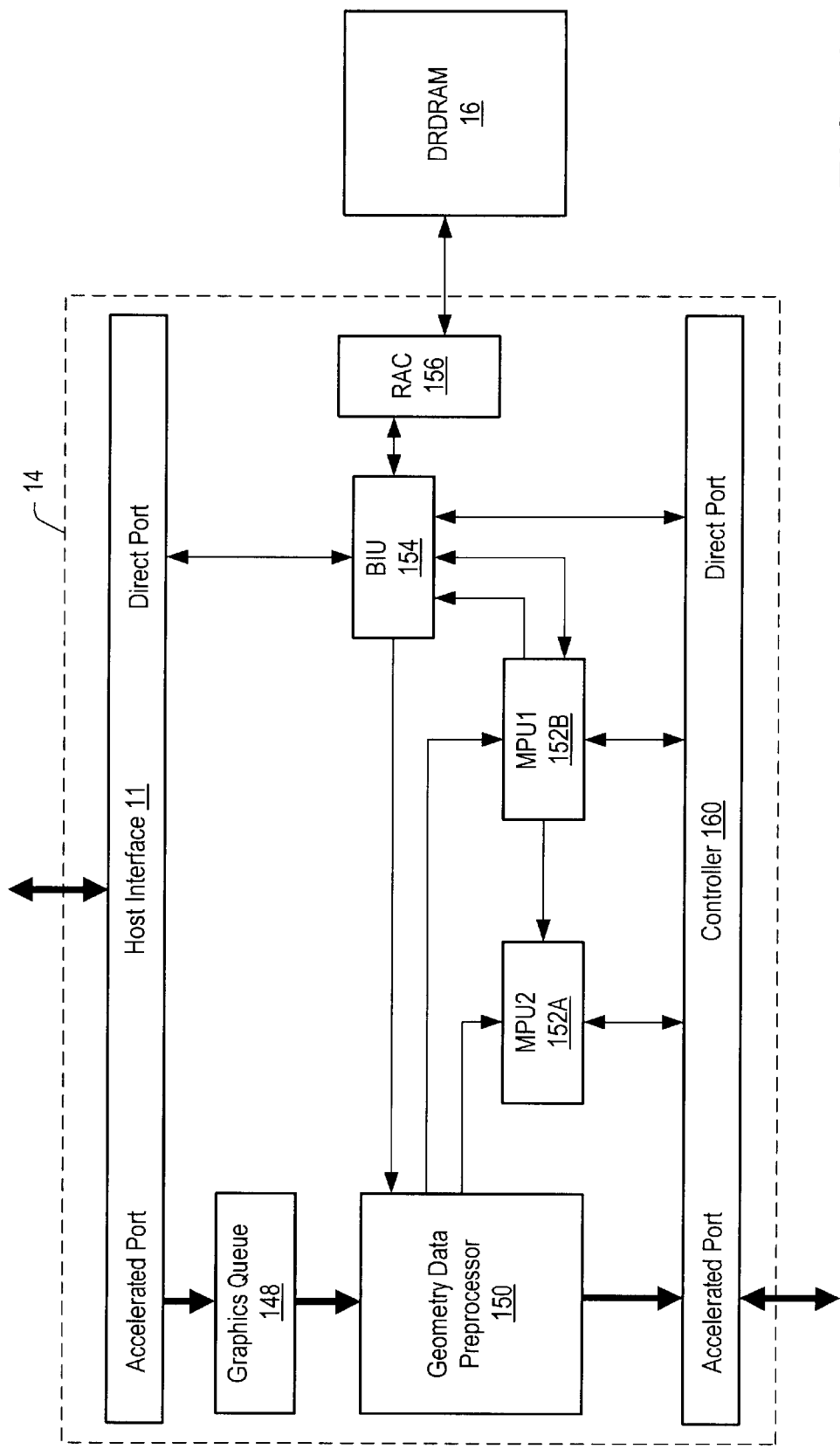
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g., stretching or shrinking), rotation, reflection, or combinations thereof. More generally, transformation may include linear mappings (e.g., matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e., the smallest addressable unit of a texture map) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
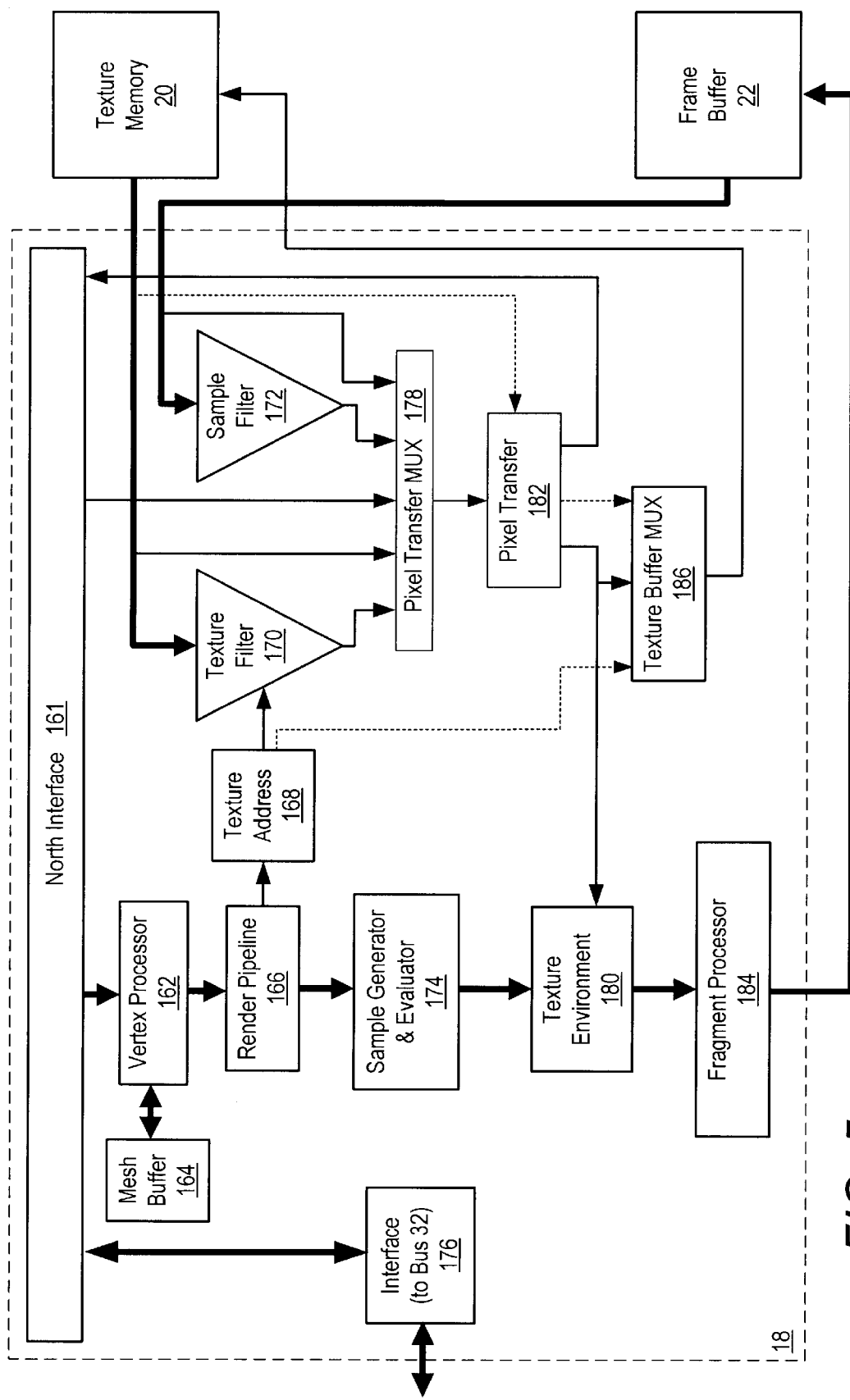
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e., transparency);

z (i.e., depth); and s, t, r, and w (i.e., texture components).

In embodiments using supersampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may also scale and bias and/or lookup texels. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

In one embodiment, texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
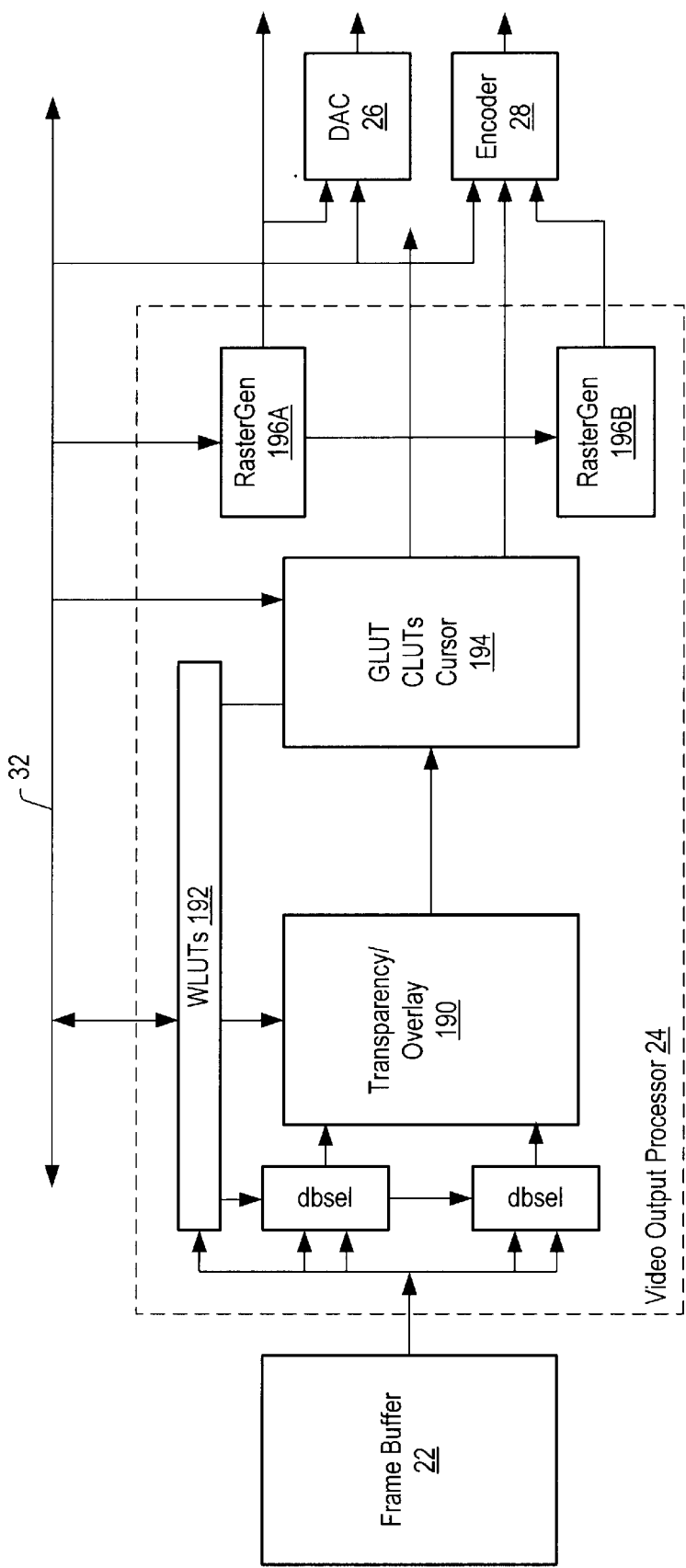
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s (not shown in FIG. 6) that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Figure 7:
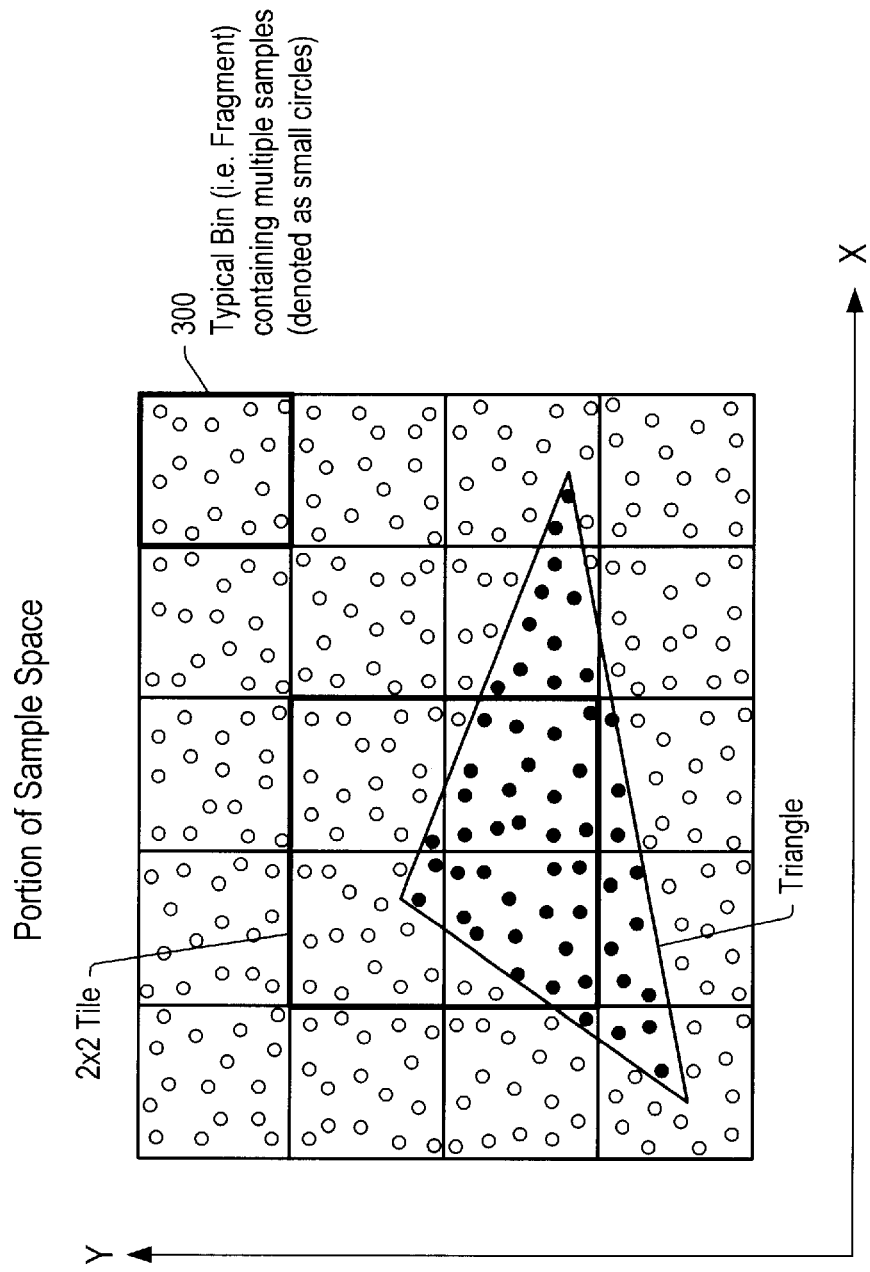
FIG. 7 shows how samples may be organized into bins in one embodiment.

Sample-to-Pixel Processing Flow—FIG. 7

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 172 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g., monitors, projectors, head-mounted displays, and so forth) through DAC 26 and/or video encoder 28.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins (e.g., bin 300) as illustrated in FIG. 7. Each bin may contain one or more samples. The number of samples per bin may be a programmable parameter.

Font Processing

A graphics system may include font-processing hardware to perform certain text and/or fill operations (for brevity, both text and fill operations are referred to herein as "font operations" unless otherwise specified). For example, in one embodiment, a hardware accelerator (e.g., hardware accelerator 18 above) may include a font-processing component. In some embodiments, a font-processing component may also perform other graphics processing functions in addition to performing font operations.

Figure 8:
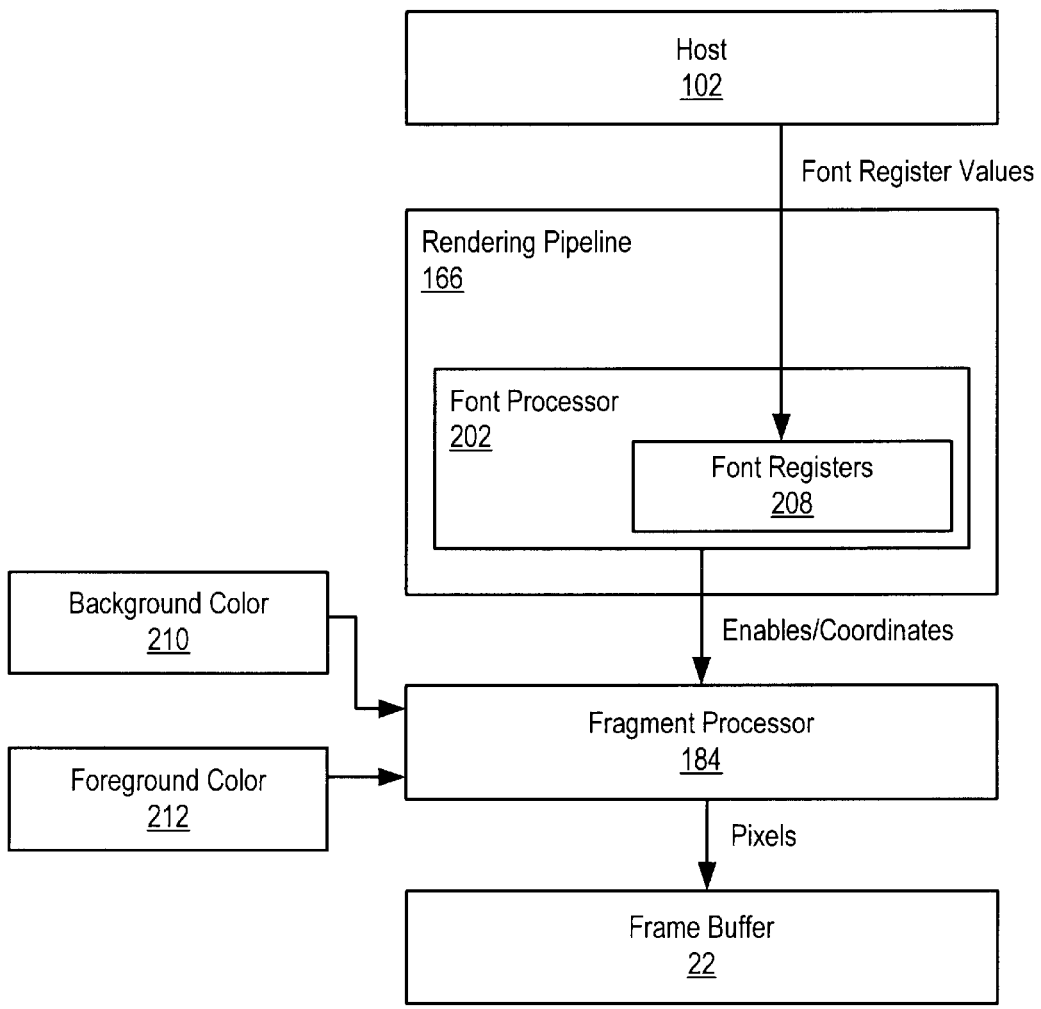
FIG. 8 is a functional block diagram of one embodiment of a graphics system.

FIG. 8 shows one embodiment of a computer system that includes a host 102, a rendering pipeline 166, a fragment processor 184, and a frame buffer 22. The rendering pipeline 166 includes a font processor 202, which includes several font registers 208. As part of a font operation, the font processor 202 may generate enables and disables (e.g., opcodes passed on to other components downstream from the font processor) for some coordinates (e.g., pixel coordinates) indicating whether a particular coordinate should be a foreground color or a background color. An enable for a particular coordinate may indicate that the foreground color should be selected. Similarly, a disable may indicate that the background color should be selected for an associated coordinate.

In the illustrated embodiment, the computer system also includes registers 210 and 212 that store the current background and foreground colors. In response to the enables and disables from the font processor 202, the fragment processor 184 may access these registers 210 and 212 to render the appropriate foreground or background color into the frame buffer 22 (or into another memory, as appropriate) for each coordinate that has an associated enable or disable.

Figure 9:
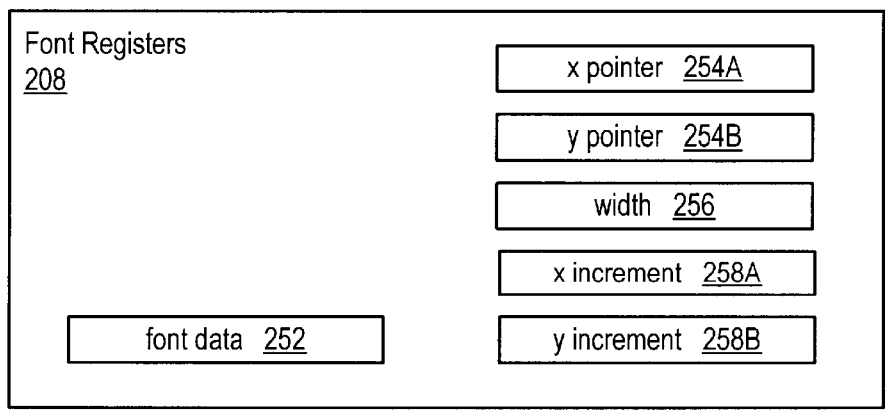
FIG. 9 is a block diagram of the registers that may be included in a font processor in one embodiment.

FIG. 9 shows one embodiment of the font registers 208. The font registers 208 store data (e.g., generated by host 102) indicating how the font processor 202 should perform a font operation. The font data register 252 may store font data indicating which coordinates should be the foreground color and which should be the background color. The data in the font data register 252 may include one or more bits per coordinate. In one embodiment, the font data may include one bit per coordinate and if a particular bit is set, it may indicate that a corresponding coordinate should be the foreground color. If a bit is cleared, it may indicate that the corresponding coordinate should be the background color.

The pointer registers 254A and 254B (collectively, pointer registers 254) store data indicating the x and y coordinates of the leftmost coordinate to be processed for a particular font operation. The width register 256 stores data indicating the size of a line (in x-coordinates) for a given font operation. The increment registers 258A and 258B (collectively, increment registers 258) store values indicating the amount by which the values in the x and y pointer registers should be incremented at the end of the current line.

The host 102 may initiate a font operation by writing new font data to the font data register 252. When a new set of font data is written to the font data register 252, the font processor 202 may start processing at the x and y coordinates identified in the pointer registers 254. The font processor may move from left to right in the line by incrementing the x value of the coordinate currently being processed. The font processor continues processing each coordinate until it processes the last coordinate in the current line (as indicated by the value in the width register 256). For example, the font processor may generate each coordinate in the line (which has a constant y coordinate) by incrementing the current x coordinate w times, where w is the width specified in the width register 256. For each x, y coordinate, the font processor 202 may determine whether that coordinate should be the foreground color or the background color (as indicated by the data in the font data register 252) and generate an enable or disable signal accordingly. The font processor may output an indication of the corresponding coordinate for each enable and disable signal it generates.

At the end of each line, the font processor may increment the current values in the x and y pointer registers 254 by the respective values in the x and y increment registers 258 so that the next font operation begins on the next specified line (unless new x and y pointer register values are written by the host 102 before the next font operation begins).

The font processor may be configured to process several coordinates per clock cycle. For example, in one embodiment, the font processor may process two coordinates per cycle.

When the current background color is transparent, the font processor 202 may not generate a disable for coordinates that should be the background color since those coordinates will not be drawn into the frame buffer 22. However, the font processor 202 still processes the font data in order to generate enables for any coordinates that should be the foreground color. In order to process more pixels per cycle, the font processor 202 may skip disabled coordinates by skipping font data identifying contiguous coordinates that should be the background color (e.g., by skipping groups of one or more contiguous zeros in the font data) when the background is transparent. For example, if the background is transparent and the font data for the first pixel to be processed during a cycle is '0', the font processor 202 may skip to the next unit of font data that is a '1' instead of generating a disable signal for that first coordinate. In order to be able to identify the current coordinate after skipping the disabled pixels, the font processor 202 may increment a current x coordinate for each coordinate that is skipped. If no more enabled coordinates (e.g., font data=1) are found within the current line, the font processor 202 may increase the values in the x and y pointer registers 254 by the values in the x and y increment registers 258 and wait for the next font operation to be initiated. Thus, if the font processor 202 is configured to process n coordinates per cycle when the background is not transparent, the font processor 202 may process more than n coordinates per cycle if the background is transparent and the current font data indicates that several of the coordinates should be the background color.

An indication generated by the host 102 (or by another component in the graphics system) may indicate whether the background is currently transparent. For example, a bit included in the data associated with a particular group of one or more coordinates may indicate whether transparent background is enabled for that group. The font processor 202 may receive this indication and use it to determine whether to skip font data that indicates that a coordinate should be the background color or to generate disables for that data.

The enables and disables, as well as an indication of the x, y coordinate associated with each enable or disable, generated by the font processor 202 may be sent down the rendering pipeline 166 to the fragment processor 184. In response to an enable or disable for a particular coordinate, the fragment processor may render an element (e.g., a pixel) having the appropriate foreground or background color at that coordinate. For example, if an enable is received for a pixel coordinate, the fragment processor 184 may write a pixel having the foreground color into the frame buffer 22 at that coordinate. If instead a disable is received for the pixel coordinate, the fragment processor 184 may write a pixel having the background color into the frame buffer 22 at that coordinate. If a disable signal is received for a coordinate and the background color is transparent, the fragment processor 184 may not render an element (e.g., a pixel) into the frame buffer 22.

Figure 10:
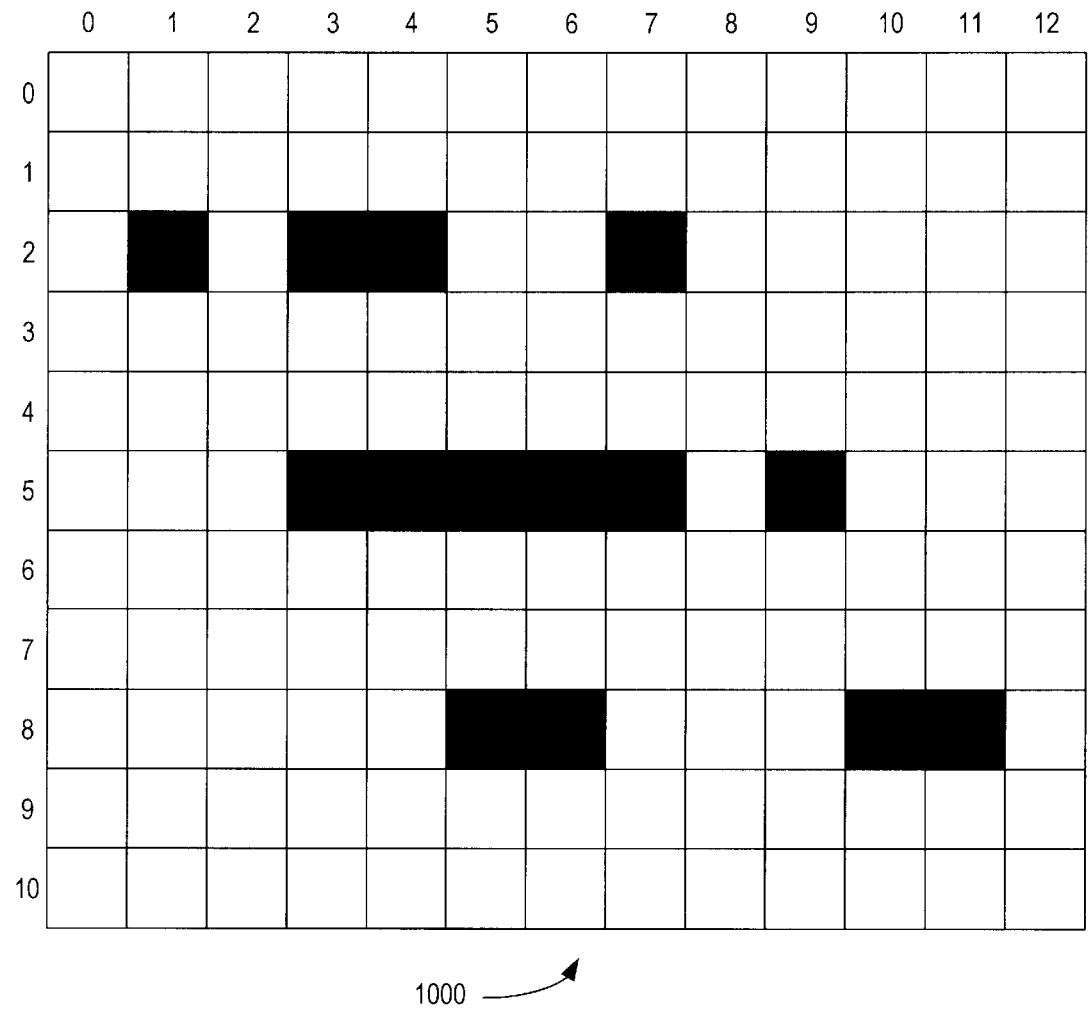
FIG. 10 illustrates how font operations may be performed in one embodiment.

FIG. 10 illustrates how an exemplary set of three font operations may be performed. Initially in this example, the x pointer register 254A is set to 1, the y pointer register 254B is set to 2, the x increment register 258A is set to 2, the y increment register 258B is set to 3, and the width register 256 is set to 6. In this example, a first font operation is initiated when a first set of font data (1011 0010 0000 0000 0000 0000 0000 0000) is written to the font data register 252. FIG. 10 shows a grid 1000 with x- and y-coordinates labeled. Pixels that are enabled by the font processor during the exemplary font operations are darkened in the grid 1000.

If the background is not transparent when the first set of font data is processed, enables and disables may be generated as follows. The first font operation starts at the x- and y-coordinates (1,2) indicated in the x and y pointer registers 254. Since the first font data bit is '1', the font processor generates an enable for this coordinate (as indicated by the darkened pixel at (1,2)) and sends the coordinate and the enable to the fragment processor. The x pointer is incremented by one to access the next pixel, (2,2) and a disable is generated for this pixel, as indicated. This process continues until the initial value of x has been incremented a number of times specified in the width register. At this point, processing of the line is complete and any remaining unprocessed data in the font data register may be ignored.

If instead the background is transparent, the font processor may not generate disables for each pixel whose corresponding font data is '0'. In one embodiment, the font processor may not generate any disables for pixels whose font data is '0' when the background is transparent. Thus, for the first set of font data shown in FIG. 10, the font processor may generate enables for (1,2), (3,2), (4,2), and (7,2).

After processing the first line, the font processor may increase the value in the x pointer register by the value in the x increment register and increase the value in the y pointer register by the value in the y increment register. Accordingly, the next font operation will begin at coordinate (3,5). Similarly, the third font operation begins at coordinate (5,8). The second and third font operation are performed similarly to the first font operation.

FIG. 11 shows a table 1102 of the enables and disables that may be generated, per cycle, for the three font data sets of FIG. 10 if transparent background is disabled in an embodiment where two font indications are processed per cycle. Since each line has a width of six, there are seven pixels per line, and thus it takes 4 cycles to process each line.

FIG. 12 also shows a table 1104 of the enables and disables that may be generated, per cycle, for the font data sets of FIG. 10 if transparent background is enabled. In this example, more than two font indications may be processed in certain cycles. For example, in cycle 3 of processing the first data set, the font processor 202 may read the font indication for coordinate (5,2). Since this font indication indicates that the background color should be selected (e.g., the font indication for coordinate (5,2) is '0') and transparent background is enabled, the font processor 202 may skip to the next font indication that indicates that the foreground color should be selected, which is the font indication for coordinate (7,2), and output an enable signal for that coordinate. As shown in FIG. 12, it may take significantly fewer cycles to process a set of font data when transparent background is enabled than when transparent background is disabled.

In some embodiments, the font processor may be configured to skip, at most, a certain number of font indications per cycle. For example, if the font processor is configured to skip, at most, eight bits per cycle, the font processor may include an eight-bit priority encoder to indicate the position of the first '1' font data bit within a set of eight bits. The font processor may also include a barrel shifter to shift the font data in order to skip intervening '0' bits.

Figure 13:
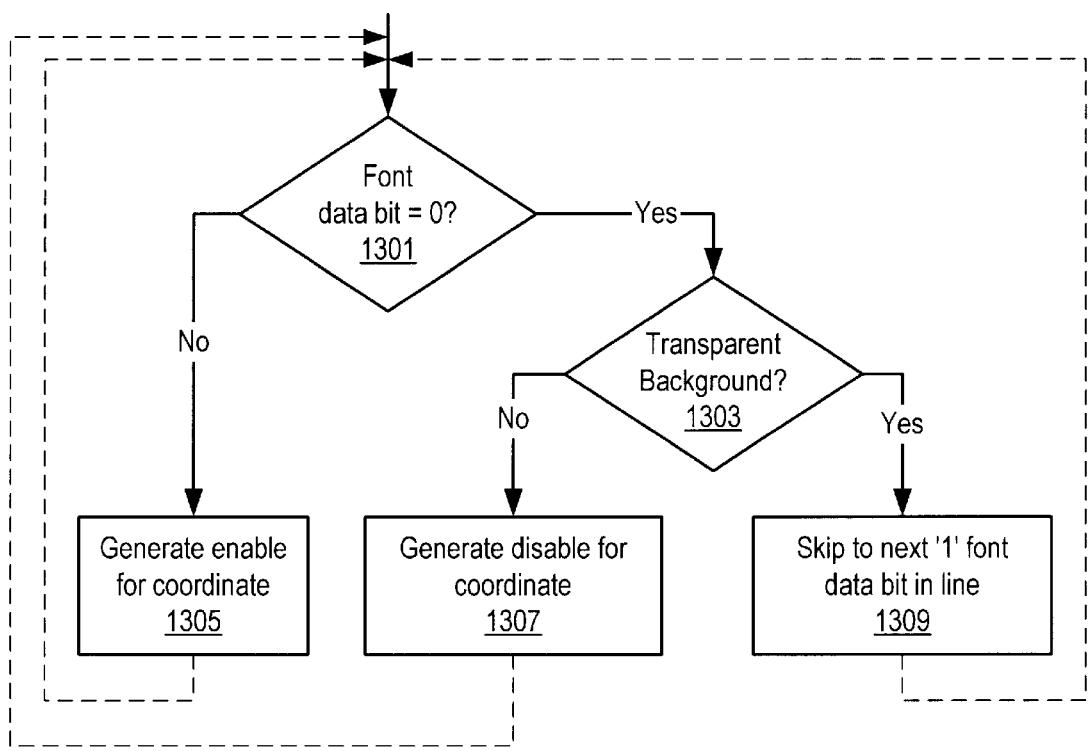
FIGS. 13 and 14 illustrate one embodiment of a method of performing a font operation.
Figure 14:
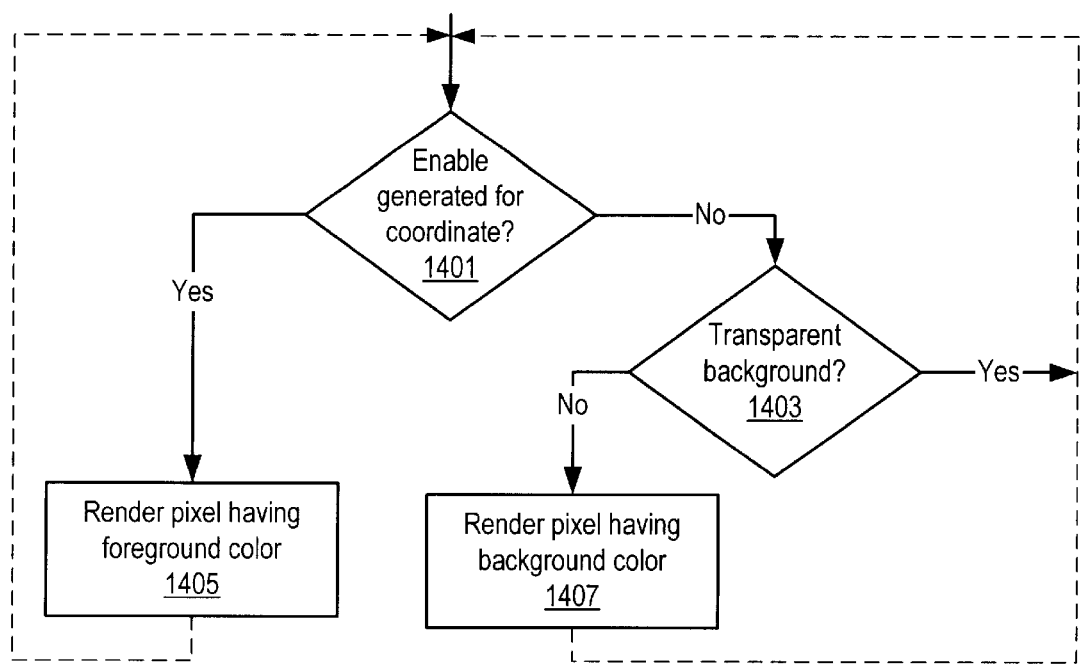

FIGS. 13 and 14 show one embodiment of a method of performing a font operation. In FIG. 13, if the current font data unit being processed indicates that the coordinate should be the foreground color (e.g., the font data bit corresponding to that coordinate is '1'), the font processor may generate an enable for that coordinate, as shown at 1301 and 1305. At 1301, if the current font data unit being processed indicates that the coordinate should be the background color (e.g., the font data bit='0', as indicated at 1301) and the current background is transparent (as indicated at 1303), the process skips to the next font data unit in the current line (if any) that indicates that a corresponding pixel should have the foreground color, as indicated at 1309. In one embodiment, there may be an upper limit on the number of font data units that can be skipped in a single cycle. If there are no font data bits indicating that an associated pixel should have the foreground color in the current line, skipping to the next font data bit may involve skipping to the end of the current line. If the current background is not transparent, a disable signal is generated for the corresponding pixel, as indicated at 1307.

Processing of the font data may continue for additional coordinates in the current line.

FIG. 14 illustrates one embodiment of a method of rendering an element (e.g., a pixel) at a particular coordinate in response to an enable or disable for that coordinate. If an enable is generated for the coordinate, the element may be rendered as having the foreground color, as indicated at 1401 and 1407. If a disable is generated for the coordinate and transparent background is not enabled, the element may be rendered with the background color, as indicated at 1401, 1403, and 1405. If a disable is generated for the coordinate and transparent background is enabled, no element may be rendered at that coordinate.

Note that while specific embodiments of the font processing system and method have been described in the context of the graphics system of FIGS. 1–7, other embodiments may be employed in different systems. Generally, a system and method of performing a font operation similar to that described above may be employed in any suitable graphics system.

Although the above embodiments have been described in considerable detail, alternative embodiments are possible and contemplated. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A graphics system comprising:

a buffer;

a font processor configured to receive a set of font data units, wherein if a background color is transparent and a first type font data unit associated with a first coordinate indicates that the first coordinate should be the background color, the font processor is configured to skip each such first type font data unit and generate an enable for a second type font data unit that indicates that a second coordinate should be a foreground color, and wherein if a background color is not transparent and a first type font data unit associated with a first coordinate indicates that the first coordinate should be the background color, the font processor is configured to generate a disable for the first coordinate;

a fragment processor coupled to access the buffer, wherein the fragment processor is coupled to receive the enable from the font processor and to responsively write an element one at the second coordinate into the buffer, wherein the element one at the second coordinate is the foreground color, and wherein the fragment processor is coupled to receive the disable from the font processor and to responsively write an element two at the first coordinate into the buffer, wherein the element two is the background color;

an x pointer register configured to store a pointer to an x-coordinate; and a y pointer register configured to store a pointer to a y-coordinate:

wherein the font processor is further configured to:
associate a font data unit in the set of font data with a coordinate identified by the x-coordinate and y-coordinate,
associate a new font data unit with a new coordinate by incrementing the pointer to the x-coordinate, and
stop processing additional font data units in the font data set in response to incrementing the pointer to the x-coordinate a number of times indicated by data stored in a width register.

2. The graphics system of claim 1, wherein the buffer comprises a frame buffer and wherein the element comprises a pixel.

3. The graphics system of claim 1, wherein the font data unit comprises a bit, wherein a value of the bit indicates whether the first coordinate should be the background color or the foreground color.

4. The graphics system of claim 1, wherein the font processor is configured to process more than one font data unit per processing cycle.

5. The graphics system of claim 1, wherein the font processor is configured to begin processing the set of font data units in response to receiving the set of font data units.

6. The graphics system of claim 1, further comprising a foreground color register coupled to the fragment processor and configured to store data indicative of the foreground color.

7. The graphics system of claim 1, wherein in response to incrementing the pointer to the x-coordinate the number of times indicated by data stored in the width register, the font processor is configured to increment the pointer stored in the x pointer register by a value stored in a x increment register and to increment the pointer stored in the y pointer register by a value stored in a y increment register.

8. A method of performing a font operation, the method comprising:
 receiving a set of font data identifying a font operation to be performed;
 if a font data unit in the set indicates that a corresponding coordinate should be a background color and transparent background is enabled, skipping to a next font data unit in the set that indicates that a coordinate should be a foreground color, and outputting an enable for the next font data unit;
 if a font data unit in the set indicates that the corresponding coordinate should be a background color and transparent background is disabled, outputting a disable for the corresponding coordinate;
 in response to the disable for a coordinate, storing a first element having a background color into a buffer; or
 in response to the enable for a coordinate, storing a second element having a foreground color into the buffer;
 associating a font data unit in the set of font data with a coordinate identified by an x-coordinate and a y-coordinate:
 associating a new font data unit with a new x-coordinate by incrementing an x pointer register to point to the new x-coordinate; and
 stopping the processing of additional font data units in the font data set in response to incrementing the pointer to the x-coordinate a number of times indicated by data stored in a width register.

9. The method of claim 8, wherein the buffer comprises a frame buffer and wherein the element comprises a pixel.

10. The method of claim 8, wherein the font data unit comprises a bit, wherein a value of the bit indicates whether the corresponding coordinate should be the background color or the foreground color.

11. The method of claim 8, further comprising processing more than one font data unit per processing cycle.

12. A method of performing a font operation, the method comprising:
 receiving a set of font data units identifying a font operation to be performed;
 skipping to the next font data unit in the set that requests a foreground color, if a first type font data unit in the set indicates that a corresponding coordinate should be a background color and transparent background is enabled;
 outputting a signal requesting a background color for a first type font data unit in the set, if the first type font data unit indicates that the corresponding coordinate should be a background color and transparent background is disabled;
 outputting a signal requesting a foreground color for a second type font data unit in the set, if the second type font data unit indicates that a coordinate should be a foreground color;
 associating a font data unit in the set of font data with a coordinate identified by an x-coordinate and a y-coordinate.
 associating a new font data unit with a new x-coordinate by incrementing an x pointer register to point to the new x-coordinate, and
 stopping the processing of additional font data units in the font data set in response to incrementing the pointer to the x-coordinate a number of times indicated by data stored in a width register.

13. The method of claim 12, further comprising;
 storing a first element having a background color in a buffer location in response to the signal requesting a background color, wherein the buffer location corresponds to the specified coordinate for the corresponding font data unit; and
 storing a second element having a foreground color in a buffer location in response to the signal requesting a foreground color, wherein the buffer location corresponds to the specified coordinate for the corresponding font data unit.

14. The method of claim 13, wherein the buffer comprises a frame buffer and wherein both the first element and the second element comprise a pixel.

15. The method of claim 12, wherein the font data unit comprises a bit, wherein a value of the bit indicates whether the first coordinate should be the background color or the foreground color.

16. The method of claim 12, further comprising processing more than one font data unit per processing cycle.

17. A graphics system comprising:
 an x pointer register configured to store a pointer to an x-coordinate;
 a y pointer register configured to store a pointer to a y-coordinate; and
 a font processor configured to:
  receive a set of font data units identifying a font operation to be performed;
  skip to the next font data unit in the set that requests a foreground color, if a first type font data unit in the set indicates that a corresponding coordinate should be a background color and transparent background is enabled;
  output a signal requesting a background color for a first type font data unit in the set, if the first type font data unit indicates that the corresponding coordinate should be a background color and transparent background is disabled; and
  output a signal requesting a foreground color for a second type font data unit in the set, if the second type font data unit indicates that a coordinate should be a foreground color;
  associate a font data unit in the set of font data with a coordinate identified by the x-coordinate and y-coordinate,
  associate a new font data unit with a new coordinate by incrementing the pointer to the x-coordinate, and
  stop processing additional font data units in the font data set in response to incrementing the pointer to the x-coordinate a number of times indicated by data stored in a width register.

18. A graphics system for processing font data comprising:
- an x pointer register configured to store a pointer to an x-coordinate;
- a y pointer register configured to store a pointer to a y-coordinate;
- an x increment register;
- a y increment register; and
- a font processor configured to:
  - receive a set of font data units identifying a font operation to be performed,
  - associate a font data unit in the set of font data with a coordinate identified by the x-coordinate and y-coordinate,
  - associate a new font data unit with a new coordinate by incrementing the pointer to the x-coordinate,
  - stop processing additional font data units in the font data set in response to incrementing the pointer to the x-coordinate a number of times indicated by data stored in a width register, and
- increment the pointer stored in the x pointer register by a value stored in a x increment register and to increment the pointer stored in the y pointer register by a value stored in a y increment register, in response to incrementing the pointer to the x-coordinate the number of times indicated by data stored in the width register.

* * * * *